United States Patent [19]

Tokuda et al.

[11] 4,164,484

[45] Aug. 14, 1979

[54] PROCESS FOR RECOVERING POLYOLEFIN AND POLYSTYRENE MATERIALS BY DISSOLVING, VACUUM-EVAPORATING AND PRECIPITATING

[75] Inventors: Masahiro Tokuda; Tadaaki Tamura; Hikokusu Kajimoto; Takafumi Shimada, all of Hiroshima; Toshiya Oyamoto, Mihara; Setsumi Ochiai, Fukuyama, all of Japan

[73] Assignee: Director-General, Masao Kubota of the Agency of Industrial Science and Technology, Tokyo, Japan

[21] Appl. No.: 866,857

[22] Filed: Jan. 4, 1978

[51] Int. Cl.$^2$ .............................................. C08J 11/04
[52] U.S. Cl. ...................................................... 260/2.3
[58] Field of Search .......................................... 260/2.3

[56] References Cited

U.S. PATENT DOCUMENTS

| | | | |
|---|---|---|---|
| 3,226,343 | 12/1965 | Rhodes | 260/2.3 |
| 3,232,891 | 2/1966 | Bata | 260/2.3 |
| 3,666,691 | 5/1972 | Spiller | 260/2.3 |
| 4,031,039 | 6/1977 | Mizumoto et al. | 260/2.3 |

*Primary Examiner*—Maurice J. Welsh
*Attorney, Agent, or Firm*—Toren, McGeady and Stanger

[57] ABSTRACT

A process for classifying plastic-containing wastes which comprises dissolving a mixture of plastics containing polyolefin-type plastics in a hydrocarbon solvent (preferably of a xylene type) at a temperature of not lower than 60° C. (preferably not lower than 80° C.), vacuum-evaporating the solvent of the solution to cause precipitation of the polyolefin-type plastics dissolved therein, separating and recovering the major portion of the precipitate, further dividing the resulting separated solution into the concentrated liquor of the precipitate yet remaining admixed in the separated solution and the phase of a solution hardly containing the precipitate, recycling the concentrated liquor and using again for dissolving the mixture of plastics, and removing the solvent from the phase of a solution hardly containing the precipitate so as to recover the polystyrene-type plastics. A process for classifying plastic-containing wastes by separating and recovering the precipitate of the polyolefin-type plastics from the mixture solution containing the same in the above-mentioned process, which comprises connecting in series a plurality of solid-liquid separating devices, sequentially disintegrating and dispersing the precipitate separated by the separating device at a preceding stage in the separated solution flowing out from the separating device at a subsequent stage and again separating the precipitate by the separating device at a still subsequent stage.

4 Claims, 3 Drawing Figures

PROCESS FOR RECOVERING POLYOLEFIN AND POLYSTYRENE MATERIALS BY DISSOLVING, VACUUM-EVAPORATING AND PRECIPITATING

This invention relates to a process for treating a mixture consisting principally of plastics and fibrous materials such as paper classified from city-type and industrial-type wastes, and classifying and recovering the plastics and the fibrous materials from the mixture. More particularly, the present invention relates to a process for effectively recoverying polyolefin-type polymer materials and polystyrene-type polymer materials from the plastic wastes with a high purity.

In recent years, the city-type and industrial-type wastes have amounted to enormous quantities and their treatment has been a matter of the utmost social concern. To this date these wastes have primarily been burnt or buried, thereby causing such social problems as environmental pollution and destruction. From the aspect of shortage of natural resources, on the other hand, development of a regeneration technique of the waste has earnestly been desired.

The inventors of this invention previously proposed a process for regenerating these wastes comprising the steps of dissolving a mixture consisting principally of paper and plastics, that have previously been classified from the wastes, in a mixed medium of a hydrocarbon type solvent and water, and then classifying the mixture into the following four groups;

(1) insoluble plastics (principally of polyvinyl chloride);
(2) paper disintegrated into a fibrous matter in the aqueous phase;
(3) polyolefin-type plastics precipitated by cooling the solution of plastics dissolved in a hydrocarbon-type solvent; and
(4) polystyrene-type plastics obtained by evaporating the solvent from the solution from which the polyolefin-type plastics have been removed.

In order to facilitate separation of the polyolefin-type plastic precipitates from the solution in precipitating and separating the polyolefin-type plastics described in Item (3) above, the inventors of this invention proposed also a process for obtaining enlarged and elongated precipitates as will be explained in the following paragraph.

FIG. 1 illustrates a schematic block diagram of the abovementioned process.

The reference numeral 1 designates a dissolving tank in which the abovementioned mixture charged from line 11 is stirred and mixed with water fed from line 12 and a solvent (xylene) supplied from line 13 at a temperature of from about 90° to about 140° C. whereby solvent-soluble plastics of the mixture such as polyolefin-type plastics and polystyrene are dissolved in the solvent while paper of the mixture is disintegrated as a fibrous matter in the water.

The reference numeral 2 designates a separation apparatus for solvent-insoluble matters in which the content of the dissolving tank 1 withdrawn from line 14 is separated from the solvent-insoluble plastics (consisting principally of polyvinyl chloride) which are to be recovered, while the fibrous matter disintegrated in the water is withdrawn together with the water from line 15 and then recovered. The solution of the solvent-soluble plastics is led through line 16 into a flask tank 3 under reduced pressure in which the solvent in the solution is flash-evaporated to thereby cause precipitation of the polyolefin-type plastics. The flash tank 3 is connected by line 22 to a decompression device (not shown) via a condensor 4. The solvent thus evaporated is led into the condenser through line 20, liquefied by the same and recycled to the flash tank 3 through line 21.

The precipitate of the polyolefin-type plastics inside the flash tank 3 is led into a separating device 5 together with the solution through line 17 where the precipitate is separated from the solution. The precipitate is then transferred to a purification device (not shown) for the polyolefin-type plastics through line 18 where the solvent admixed in the precipitate is separated and the polyolefin-type plastics are purified. The solvent separated in this instance is recycled to the dissolving tank 1 through the line 13.

The solution separated by the separating device 5 contains principally the polystyrene-type plastics dissolved therein, is transferred to a recoverying device (not shown) for the polystyrene through line 19 in which the solvent in the solution is separated by evaporation and the polystyrene-type plastics are recovered. The solvent separated by evaporation in this instance is recycled to the dissolving tank 1 through line 13.

Said conventional method have a disadvantageous point as follows.

(1) In order to obtain enlarged and elongated precipitate of the polyolefin-type plastics in the abovementioned process steps, it is necessary to elevate the concentration of the polyolefin-type plastics in the solution immediately after the solvent evaporation at the time of flash cooling above a predetermined range, as disclosed in the previous proposal of the present inventors.

FIG. 2 illustrates an example of such a range. In FIG. 2, the symbol A indicates an operation range within which the enlarged and elongated precipitate can be obtained, and the symbol B indicates an operation range within which a viscous precipitate is formed.

As can be clearly seen from FIG. 2, if the polyolefin-type plastics in the abovementioned mixture wholly consist of high density polyethylene or polypropylene or their mixture, the enlarged and elongated precipitate can be obtained when the concentration exceeds 5% by weight in the solution immediately after the solvent evaporation at the time of flash cooling. If the polyolefin-type plastics solely consist of low density polyethylene, the concentration of at least 20% by weight is necessary so as to obtain the enlarged and elongated precipitate.

On the other hand, in order to facilitate the dissolving operation and the separating operation of the solvent-insoluble matters inside the dissolving tank 1, it is necessary to keep the polymer concentration below about 15% by weight prior to the flash-cooling operation. For this reason, it is not possible to set the condition for the dissolving operation which permits a high polymer concentration in the solution for the sole purpose of obtaining the enlarged and elongated precipitate. When the content of the polyolefin-type plastics is low in the abovementioned mixture, it is necessary to elevate the solution temperature prior to the flash cooling operation and to lower the degree of reduced pressure inside the flash tank in order to obtain the enlarged and elongated precipitate.

However, elevation of the solution temperature prior to flash cooling is undesirable not only from the viewpoint of the heat economy but also from the viewpoint of safety and economy of appliances because the pressure resistance of the appliances must be increased to cope with the rise in the inner pressure arising from the rise in the vapor pressure of the solution. Lowering of the degree of reduced pressure inside the flash tank is not preferred, either, because it leads to the increase in load of the decompression device and to the occurrence of accidents arising from the inflow of the air into the system.

Furthermore, the enlarged and elongated precipitate can not be obtained along with the fluctuation in the composition of the abovementioned mixture, and when only a viscous precipitate is formed, the major portion of the precipitate flows out on the filtrate side, thereby substantially lowering the classification accuracy of the polyolefin-type plastics and the polystyrene-type plastics.

(2) Even when the enlarged and elongated precipitate is obtained by the flash cooling operation, a part of the precipitate is cut off and pulverized during the transfer stage whereby the fine precipitate admixes into the separated filtrate and sometimes causes lowering of the purity of the polystyrene-type plastics and lowering of the recovery rate of the polyolefin-type plastics.

(3) The precipitate (polyolefin-type plastics) separating device 5 contains a considerable amount of the solution. Since the polystyrene-type plastics dissolved in this solution admixes as impurities into the polyolefin-type plastics to be purified by the evaporation separation method, it is not possible to enhance the concentration of the polystyrene-type plastics in the solution with the consequence that a greater heat energy is consumed for evaporating and separating the solvent in the filtrate, resulting in the economical disadvantage.

The inventors have made intensive studies to improve the abovementioned problems and clarified the following points;

(1) When the filtrate of the separating device 5 for the polyolefin-type plastics is settled, the layer of supernatant can be easily separated at the upper layer section.

(2) When the precipitate separated by the separating device 5 for the polyolefin-type plastic precipitate is dispersed in a solvent, the concentration of the polystyrene-type plastics in the dispersion is lowered simply by diluting the dispersion with a solvent. In the precipitate of the polystyrene-type plastics separated again by a screw press type filtration device, the polystyrene-type plastics are not contained in the precipitate but simply attach thereto. Hence, they can be easily removed when washed with a solvent.

The present invention is based on the above-mentioned findings and provides a process for classifying plastic-containing wastes which comprises dissolving a mixture of plastics containing polyolefin-type plastics in a hydrocarbon solvent (preferably a xylene type) at a temperature of not lower than 60° C. (preferably not lower than 80° C.), vacuum-evaporating the solvent of the solution to cause precipitation of the polyolefin-type plastics dissolved therein, separating and recoverying the major portion of the precipitate, further dividing the resulting separated solution into the concentrated liquor of the precipitate yet remaining admixed in the separated solution and the phase of a solution hardly containing the precipitate, recycling the concentrated liquor and using again for dissolving the mixture of plastics, and removing the solvent from the phase of a solution hardly containing the precipitate so as to recover the polystyrene-type plastics.

The present invention provides also a process for classifying plastic-containing wastes by separating and recoverying the precipitate of the polyolefin-type plastics from the mixture solution containing the same in the above-mentioned process, which comprises connecting in series a plurality of solid-liquid separating devices, sequentially disintegrating and dispersing the precipitate separated by the separating device at a preceding stage in the separating solution flowing out from the separating device at a subsequent stage and again separating the precipitate by the separating device at a still subsequent stage.

The process of the present invention provides the following effects.

(1) Since the precipitate which can not be separated and recovered by the separating device for the precipitate of the polyolefin-type plastics is compulsively recycled to dissolving tank 1 as a mixture solution together with the separated solution, the concentration of the polyolefin-type plastics in the mixture solution of plastics is automatically controlled so as to provide the enlarged and elongated precipitate of the polyolefin-type plastics by the flash cooling operation.

Unlike the conventional method, therefore, it is no longer necessary in accordance with the present process to analyze the composition of the raw materials and correspondingly adjust a flow quantity of the solvent. Namely, it is one of the great industrial advantages provided by the present process that the plant itself has self-controllability in response to the change in the composition of the raw materials.

(2) It is possible to recover the solution dissolving therein the polyolefin-type plastics not substantially containing the abovementioned precipitate from the separated solution from the separating device for the precipitate of the polyolefin-type plastics, thereby improving the purity of the polystyrene-type plastics recovered by evaporation of said solution and minimizing the loss of the polyolefin-type plastics.

(3) The precipitate of the polyolefin-type plastics can be brought into a kind of counter-flow contact with the hydrocarbon solvent and washed by the same using the plural separating devices therefor connected in series. Hence, even when the concentration of the polystyrene-type plastics is high in the mixture solution of plastics, it is possible to recover the polyolefin-type plastics of a high purity.

Still another advantage of the present process is that since the concentration of the polystyrene-type plastics can be enhanced in the mixture solution of plastics, it is also possible to reduce a heat energy required for evaporating the solvent and recoverying the polystyrene-type plastics.

Next, the process of the present invention will be more fully illustrated with reference to the accompanying drawings.

Figure 3:
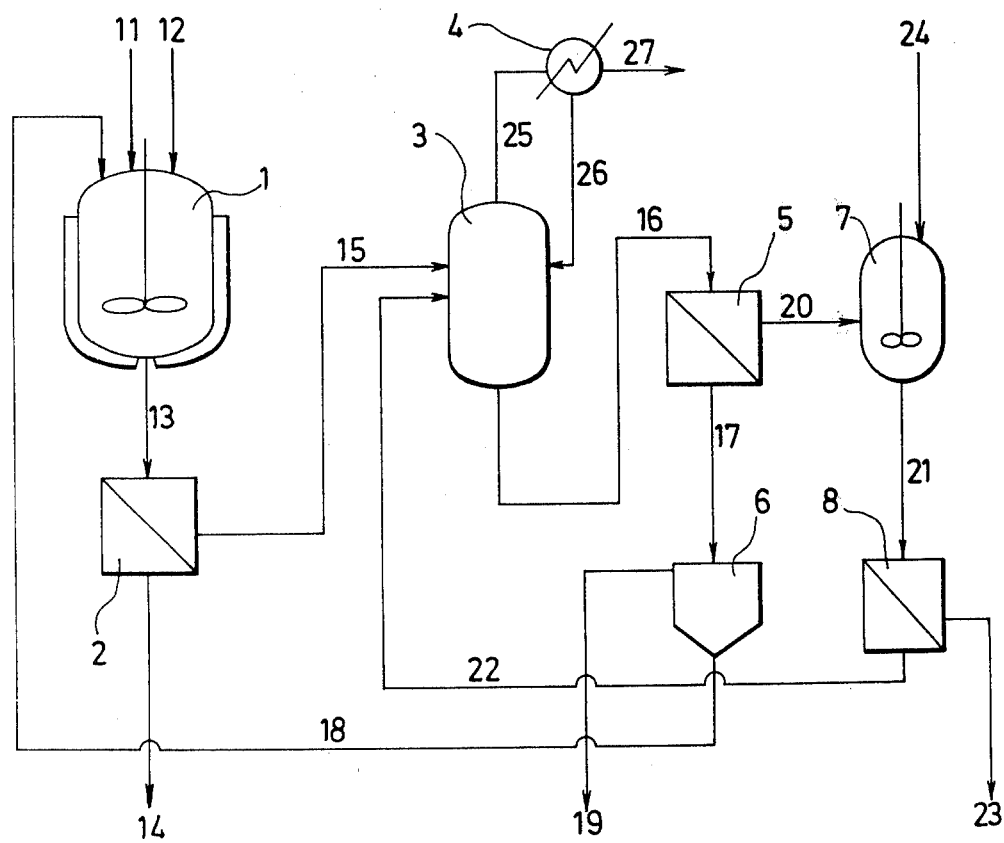
FIG. 3 is a block diagram showing an embodiment of the process of the present invention.

In FIG. 3, the reference numeral 1 designates the dissolving tank in which the mixture consisting principally of plastics and paper from line 11 is stirred with water fed from line 12 and a mixture solution of the precipitate of plastics and a hydrocarbon solvent (preferably of a xylene type) dissolving therein a part of the plastics that is recycled from line 18. The temperature inside the dissolving tank is maintained to at least 60° C. (preferably not lower than 80° C.) and solvent-soluble plastics of the mixture charged into the dissolving tank 1 such as the polyolefin-type plastics and the polystyrene-type plastics, are dissolved in the hydrocarbon solvent. The paper in the mixture is disintegrated as a fibrous material in the water.

Next, the content of the dissolving tank 1 is charged into the separating tank 2 for solvent-insoluble matters through line 13. The separating tank for solvent-insoluble matters is composed of a net-like filter and a settling-/separating tank, and the net-like filter separates insoluble plastics (principally polyvinyl chloride), cellophane and a part of the fibrous material. In the settling-/separating tank, the phase of solution and the aqueous phase are separated by means of gravity whereby the fibrous material transfers into the aqueous phase and is withdrawn and recovered together with the water from line 14.

The solution that has been separated by the separating device for solvent-insoluble matters is charged through line 15 into the flash tank 3 kept under reduced pressure. This flash tank 3 is connected by line 27, via the condensor 4, to a vacuum apparatus (not shown), and kept at such a reduced pressure level that the solution temperature therein is not higher than 80° C. (preferably not higher than 60° C.).

The solution led into the flash tank 3 through line 15 is rapidly quenched by the latent heat of evaporation as the solvent contained in the solution is instantaneously evaporated. As a result, the polyolefin-type plastics are caused to precipitate at this time.

The solvent thus evaporated is led through line 25 to the condenser 4, condensed and liquefied therein and recycled to the flash tank 3 through line 26.

The mixture solution containing the precipitate of the polyolefin-type plastics inside the flash tank 3 is mixed with the solution of the hydrocarbon solvent dissolving therein small amounts plastics (principally polystyrene-type plastics) that is recycled through line 22, and then fed into the separating device 5 for the precipitate through line 16.

Suitable examples of the separating device for the precipitate are solid-liquid separating devices such as a centrifugal separator and a filter press. Of these, a filter press-type filtration device is preferred.

After concentrated into a solid concentration of about 20–25% by weight in the separating device 5, the precipitate is then charged into the dispersing tank 7 through line 20.

After the precipitate is separated inside the separating device 5, the resulting separated solution is fed into the concentrating device 6 through line 17 in which the precipitate (polyolefin-type plastics) still remaining admixed in the separated solution is concentrated, and a supernatant solution not substantially containing the precipitate is separated.

Though this embodiment uses a thickener as the concentrating device 6, any type of device may be likewise used so long as it uses the difference of specific gravity of the materials, such as a centrifugal separator, a liquid cyclone, and the like. Hence, the process of the invention is in no way restricted by the concentrating device.

A predetermined amount of the concentrated solution of the precipitate concentrated by the concentrating device 6 is recycled as a solution of plastics to the dissolving tank 1 through line 18.

The solution separated in the concentrating device 6 which does not substantially contain the abovementioned precipitate is transferred through line 19 to the recoverying device (not shown) for the polystyrene-type plastics.

The concentration of the precipitate in the separated solution to be fed through line 17 to the concentrating device 6 varies in accordance with properties of the precipitate of the polyolefin-type plastics inside the flash tank 3. If the precipitate is of the enlarged and elongated type, the major part thereof is separated by the separating device 5 for the precipitate. However, when, for example, the amounts of the polyolefin-type plastics become smaller in the mixture to be fed into the dissolving tank 1 through line 18 to cause lowering the concentration of the polyolefin-type plastics in the solution immediately after evaporation of the solvent inside the flash tank 3, the precipitate of the plastics becomes viscous, and then the precipitate is hardly separated by the separating device 5 and flows into the concentrating device 6 together with the separated solution. Since the precipitate is concentrated in the concentrating device 6 and recycled to the dissolving tank 1, however, the concentration of the polystyrene-type plastics increases, after all, inside the dissolving tank 1, thereby affording the enlarged and elongated precipitate inside the flash tank 3.

The solution transferred to the recoverying device for the polystyrene-type plastics through line 19 does not substantially contain the abovementioned precipitate. It is therefore obvious that the purity is improved for the product of the polystyrene-type plastics that are recovered as the evaporation residue of this solution.

In this manner, the process of the present invention makes it possible to always obtain the enlarged and elongated precipitate of the polyolefin-type plastics irrespective of the fluctuation in the composition of the raw materials and to separate the precipitate in a convenient manner. In addition, it is possible in accordance with the process of the invention to recover the polystyrene-type plastics of a higher purity.

The precipitate of the polyolefin-type plastics supplied to the dispersing tank 7 is dispersed and disintegrated in the hydrocarbon solvent (preferably of a xylene type) supplied through line 24 and then fed to the separating device for the precipitate from line 21.

The separating device 8 may be the same type as the separating device 5. The precipitate separated by the separating device 8 is supplied to the purifying device (not shown) for the polyolefin-type plastics through line 23 in which the solvent is separated by evaporation and recovered as substantially pure polyolefin-type plastics.

The separated solution after the precipitate is separated by the separating device 8 is recycled through line 22 to the flash tank 3.

Namely, the precipitate charged into the dispersing tank 7 through line 20 is washed with the hydrocarbon solvent supplied through line 24. It is therefore obvious that the concentration of the polystyrene-type plastics involved with the precipitate in the solution becomes lower. It is also obvious, therefore, that the amounts of the polystyrene-type plastics involved with the precipitate become smaller, and the purity of the plastics obtained by separating the solvent by evaporation is improved as much.

In this embodiment, two units of the separating devices, i.e., the separating devices 5 and 8, are shown connected in series, but a required number of the separating devices may be disposed in series, whenever necessary. Consequently, a pure product of the polyolefin-type plastics can be recovered irrespective of the concentration of the polystyrene-type plastics in the dissolving tank. This means also that the concentration of the polystyrene-type plastics can be enhanced in the solution recovered from line 19, thus reducing the heat quantity required for separating and recoverying said plastics from the solution.

The solvent in the solution withdrawn from line 19 and one in the solution withdrawn from line 23 are separated by evaporation, respectively, in the recovering device for the polystyrene-type plastics and the one for the polyolefin-type plastics, and recycled as a substantially pure solvent to the dispersing tank 7 through line 24.

The solid-liquid separators 5 and 8 are the same type of screw presses ("Press Master") and a thickener is used as the concentrating device 6.

The hydrocarbon solvent used is the same as used in Comparative Example, and the methods of purifying the polyolefin-type plastics and recoverying the polystyrene-type plastics are also the same as those used in Comparative Example.

The principal conditions for the experiment and the purity of the recovered product are also illustrated in the attached Table.

It can be clearly appreciated from the results of experiments shown in the Table, the process of the present invention enables to substantially perfectly classify and recover the polyolefin-type plastics and the polystyrene-type plastics in accordance with their types and at the same time, reduces to about ⅓ of the conventional method the heat consumption required for evaporating and separating the solvent during the recoverying operation of the polystyrene-type plastics.

Table

Experimental results of Comparative Example and Example

| | Item | Unit | Comp. Ex. | Example |
|---|---|---|---|---|
| Operation conditions | Feed q'ty of wastes into dissolving tank | kg/h | 40 | 40 |
| | Feed q'ty of water into dissolving tank | kg/h | 400 | 400 |
| | Feed q'ty of solvent into dissolving tank | kg/h | 150 | 150 |
| | Temperature inside dissolving tank | °C. | 121–135 | 120–135 |
| | Solution temp. at inlet of flash tank | °C. | 115–135 | 118–135 |
| | Solution temp. inside flash tank | °C. | 46–53 | 45–54 |
| | Feed q'ty of solvent into dispersing tank | kg/h | — | 80 |
| | Heat q'ty required for recoverying 1 kg of product during recoverying step of polystyrene-type plastics | kcal/kg | 12,000–25,000 | 3,500–7,000 |
| Purity of product | Concentration of polystyrene-type plastics in recovered polyolefin-type plastics | wt.% | 1.8–10.5 | 0.3–1.2 |
| | Concentration of polyolefin-type plastics in recovered polystyrene-type plastics | wt.% | 14.6–30.3 | 0.6–6.3 |

COMPARATIVE EXAMPLE

Figure 1:
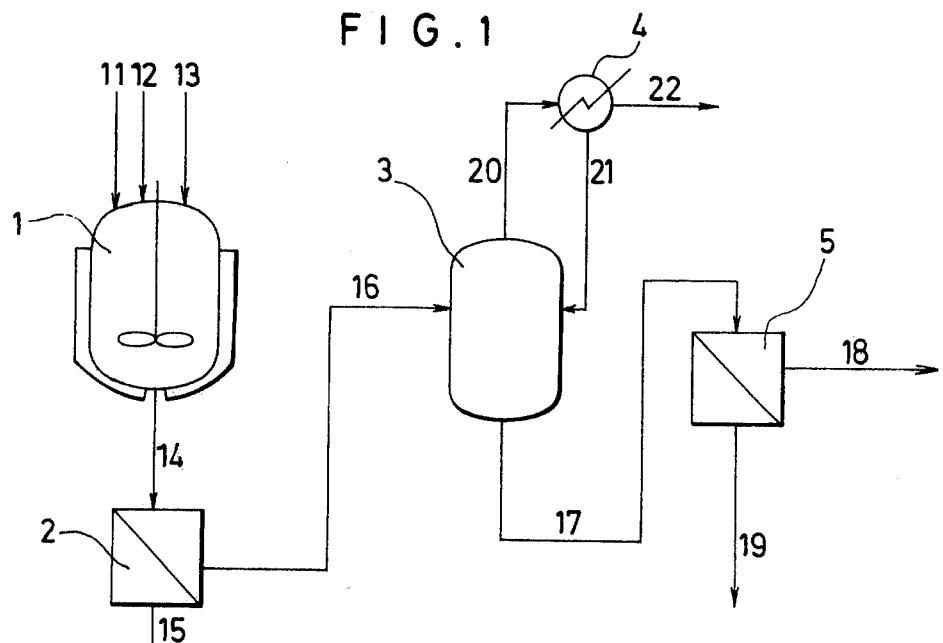
FIG. 1 is a block diagram showing an embodiment of the prior art process.
Figure 2:
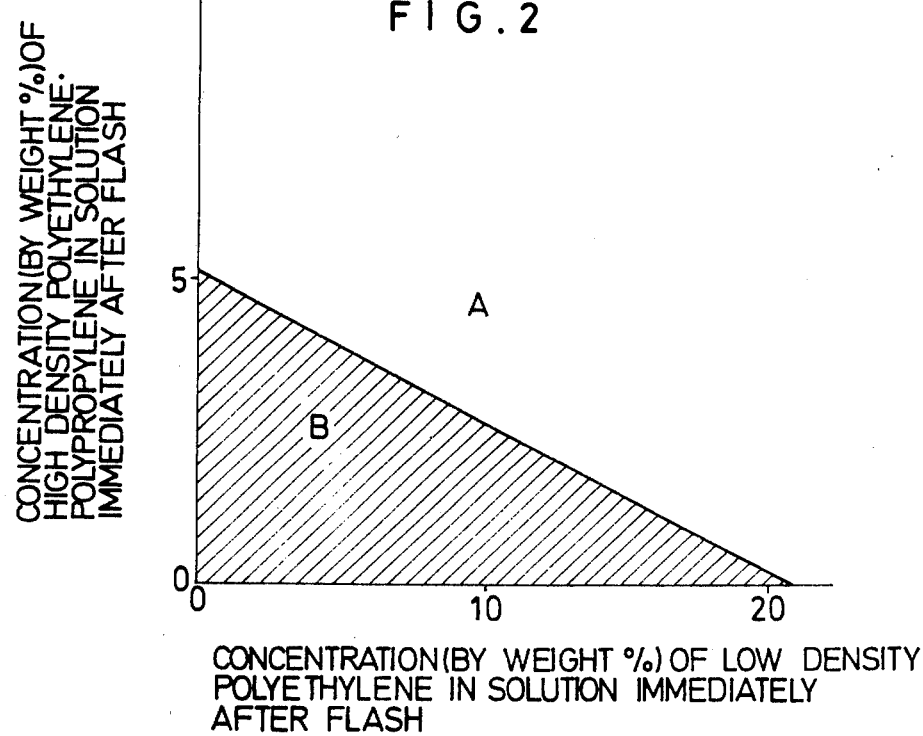
FIG. 2 is a chart of the experimental results showing the operation range for flash cooling in order to obtain the enlarged and elongated precipitate of the polyolefin-type plastics.

An experiment for separating and recoverying plastics in accordance with their types is carried out by the process steps shown in the block diagram of FIG. 1 using a mixture consisting principally of paper and plastics that has been classified from the city-type wastes collected in a certain city.

Mixed xylene is used as the hydrocarbon solvent. A screw press ("Press Master") is used as the solid-liquid separator 5, and the purification of the polyolefin-type plastics separated by the solid-liquid separator 5 is effected by a steam stripping method. Recovery of the polystyrene-type plastics from the separated solution separated by the solid-liquid separator is made in accordance with a flash evaporation method by concentrating the solution to a solid concentration of about 60% by weight and thereafter evaporating and separating the solvent using a biaxial multi-disc type evaporator.

The principal conditions for the experiment and the purity of the recovered product are illustrated in the attached Table.

EXAMPLE

An experiment for classifying the plastics is carried out in accordance with the block diagram of FIG. 3 using the same mixture as Comparative Example as the raw materials.

What is claimed is:

1. A process for recovering polyolefin and polystyrene from plastic wastes which comprises;
    dissolving a mixture of plastics containing polyolefin plastics using a hydrocarbon solvent;
    vacuum-evaporating the solvent of the solution to thereby cause precipitation of the polyolefin plastics contained in the solution;
    separating and collecting the major portion of the plastics thus precipitated;
    dividing further the resulting separated solution into a concentrated solution of the precipitate yet remaining admixed therein and the phase of a solution not substantially containing the precipitate;
    recycling and using again the concentrated solution of the precipitate as a solution for dissolving said mixture of plastics; and
    removing the solvent from the phase of a solution not substantially containing the precipitate to thereby recover polystyrene plastics.

2. The process of claim 1 wherein the mixture of the plastic contains paper and the mixture is dissolved in a solvent of a hydrocarbon and water so that the paper disintegrates into a fibrous material in the water and the paper and any other undissolved material in the hydrocarbon are separated from the solution of the plastic dissolved in the hydrocarbon and said solution is then subjected to evaporation and reduced pressure.

3. A process for recovering polyolefin and polystyrene from plastic containing wastes which comprises;

dissolving a mixture of plastics containing polyolefin plastics using a hydrocarbon solvent;

vacuum-evaporating the solvent of the solution to thereby cause precipitation of the polyolefin plastics in the solution;

sequentially separating the precipitate from the mixture solution containing the precipitate by repetitive separating operations;

charging and dissolving the resulting precipitate in the separated solution sequentially obtained by subsequent separating operations;

separating thereafter the precipitate;

dividing the solution from which the major portion of the precipitate has been separated and recovered into a concentrated solution of the precipitate and the phase of a solution not substantially containing the precipitate;

recycling and using again the concentrated solution of the precipitate as a solution for dissolving said mixture containing plastics; and removing the solvent from the phase of a solution not containing the precipitate to thereby recover polystyrene plastics.

4. The process of claim 3 wherein the mixture of the plastic contains paper and the mixture is dissolved in a solvent of a hydrocarbon and water so that the paper disintegrates into a fibrous material in the water and the paper and any other undissolved material in the hydrocarbon are separated from the solution of the plastic dissolved in the hydrocarbon and said solution is then subjected to evaporation and reduced pressure.

* * * * *